United States Patent [19]

Ng

[11] Patent Number: 4,733,259

[45] Date of Patent: Mar. 22, 1988

[54] TILTABLE TRIPOD ATTACHMENT FOR A CAMERA

[76] Inventor: Chong Y. Ng, 905 NE. 45th St., Seattle, Wash. 98105

[21] Appl. No.: 25,956

[22] Filed: Mar. 16, 1987

[51] Int. Cl.⁴ ............................................. G03B 17/00
[52] U.S. Cl. .................... 354/293; 352/243; 248/168; 248/179
[58] Field of Search ................ 354/81, 82, 293, 294; 352/243; 248/168, 178, 179, 183, 186

[56] References Cited

U.S. PATENT DOCUMENTS

| | | | |
|---|---|---|---|
| 2,543,352 | 2/1951 | Brown | 248/183 |
| 2,886,276 | 5/1959 | Epperson | 248/183 |
| 3,575,098 | 4/1971 | Jones | 354/293 |
| 4,081,814 | 3/1978 | Bulland | 354/293 |
| 4,198,150 | 4/1980 | Sloop | 354/293 |
| 4,241,988 | 12/1980 | Lepp | 354/293 |
| 4,319,825 | 3/1982 | Newton | 354/293 |
| 4,341,452 | 7/1982 | Korling | 354/293 |
| 4,439,032 | 3/1984 | Congdon | 354/293 |

*Primary Examiner*—L. T. Hix
*Assistant Examiner*—Brian W. Brown

[57] ABSTRACT

Three pivotally interconnected arms are pivotally and slidably connected to a frame which is slidably connected to a base. One of the arms supports a camera thereon. The arms are pivotal to the left and to the right to reformat a camera view from horizontal to vertical or vice versa. The base slides with respect to the frame to eliminate horizontal parallax error. Vertical parallax error can be compensated for by elevating the arm supporting the camera.

10 Claims, 11 Drawing Figures

TILTABLE TRIPOD ATTACHMENT FOR A CAMERA

DESCRIPTION

1. Technical Field

The invention relates to camera supports. Specifically, the invention relates to devices for supporting and rotating cameras having rectangular formats to reformat the camera view.

2. Background Art

It is well known that the sharpness of a photograph can be improved if the camera is supported on a tripod or other similar camera support. Many cameras, especially 35 mm cameras have a rectangular film formats. Thus, it is often desirable, depending on the photographic subject, to reformat the camera view between vertical and horizontal compositions.

Conventional camera tripods are particularly ill-equipped for reformating camera compositions between vertical and horizontal. In particular, some conventional tripods permit rotation of the camera about an axis which is perpendicular to the lens axis. This rotation axis is often displaced a substantial distance from the lens axis, as is shown in FIG. 1 of U.S. Pat. No. 2,886,276, issued to Epperson. With this structure, horizontal and vertical parallax errors are introduced into the reformatted composition. This parallax error may be undesirable.

Other prior art devices have recognized this disadvantage of conventional camera support structures. U.S. Pat. No. 4,198,150, to Sloop, and U.S. Pat. No. 4,319,825, issued to Newton, permit ninety-degree rotation of a camera with respect to a frame about the camera lens axis. The final position of the camera lens axis is substantially the same, so that parallax error is not introduced into the picture. However, it is only possible to rotate the camera ninety degrees in one direction (i.e., clockwise or counterclockwise).

U.S. Pat. No. 4,341,452, to Korling, alleviates this problem by providing a multi-axis gimbal framework for a camera which permits rotation of a camera about the lens axis ninety degrees in either direction. However, the camera support is unacceptably bulky and interferes with operation of the camera controls.

Therefore, a need exists for a device which permits a camera to be mounted on a support, such as a tripod, and which permits rotation of the camera ninety degrees in either direction about the lens axis without introducing parallax error into the recomposed photograph.

DISCLOSURE OF THE INVENTION

It is an object of the present invention to provide a device which can rotate a camera ninety degrees clockwise or counterclockwise and which can compensate for horizontal parallax error while the device is mounted on a tripod or other similar support.

It is also an object of the present invention to provide a device which can support a camera through a rotation of less than ninety degrees clockwise or counterclockwise.

The invention achieves these objects, and other objects and advantages which will become apparent from the description which follows, by providing a frame with three pivotally interconnected arms. One of the arms can be removably attached to a camera. The remaining two arms are pivotally attached to the frame at one end of each arm, and pivotally attached to the third arm at the remaining ends of the first two arms.

A base is slidably attached to the frame. The base can be removably attached to a tripod or other camera support. The camera first can be rotated about the pivotal connections between the second and third arms and the frame, either to the left or the right. The frame can then be linearly displaced with respect to the base to realign the lens axis with its original position. In this way, the composed view can be reformatted from horizontal to vertical, either to the left or the right, without introducing any horizontal parallax error in the reformatted composition. Vertical parallax error can be eliminated by adjusting the attachment height. This can easily be accomplished by adjusting the height of the tripod center column.

In the preferred embodiment, the arms cannot be rotated substantially more than ninety degrees to prevent the attachment and camera from becoming unstable on top of the tripod. A mechanism is also provided to selectively prevent substantial counterrotation of the arms after the camera position has been changed from horizontal to vertical. This mechanism can also be used to selectively fix the arms in any rotational position between zero and ninety degrees.

The ends of the second and third arms, which are pivotally attached to the frame, can also be made selectively slidable with respect to the frame so that the first arm, to which the camera is attached, can be raised vertically with respect to the frame. This feature is particularly useful when the camera is reformatted from a vertical to horizontal position. In this way, vertical parallax error introduced during rotation of the camera about the pivot axes can be compensated by vertically raising the first arm.

The frame can also be provided with a cavity which is adapted to receive a separable, foldable attachment support. The attachment support has a plurality of foldable legs and has a portion which can be attached to the slidabe base. With the legs in the folded position, the portable support can be received within the receptacle defined by the frame.

BEST MODE FOR CARRYING OUT THE INVENTION

Figure 1:
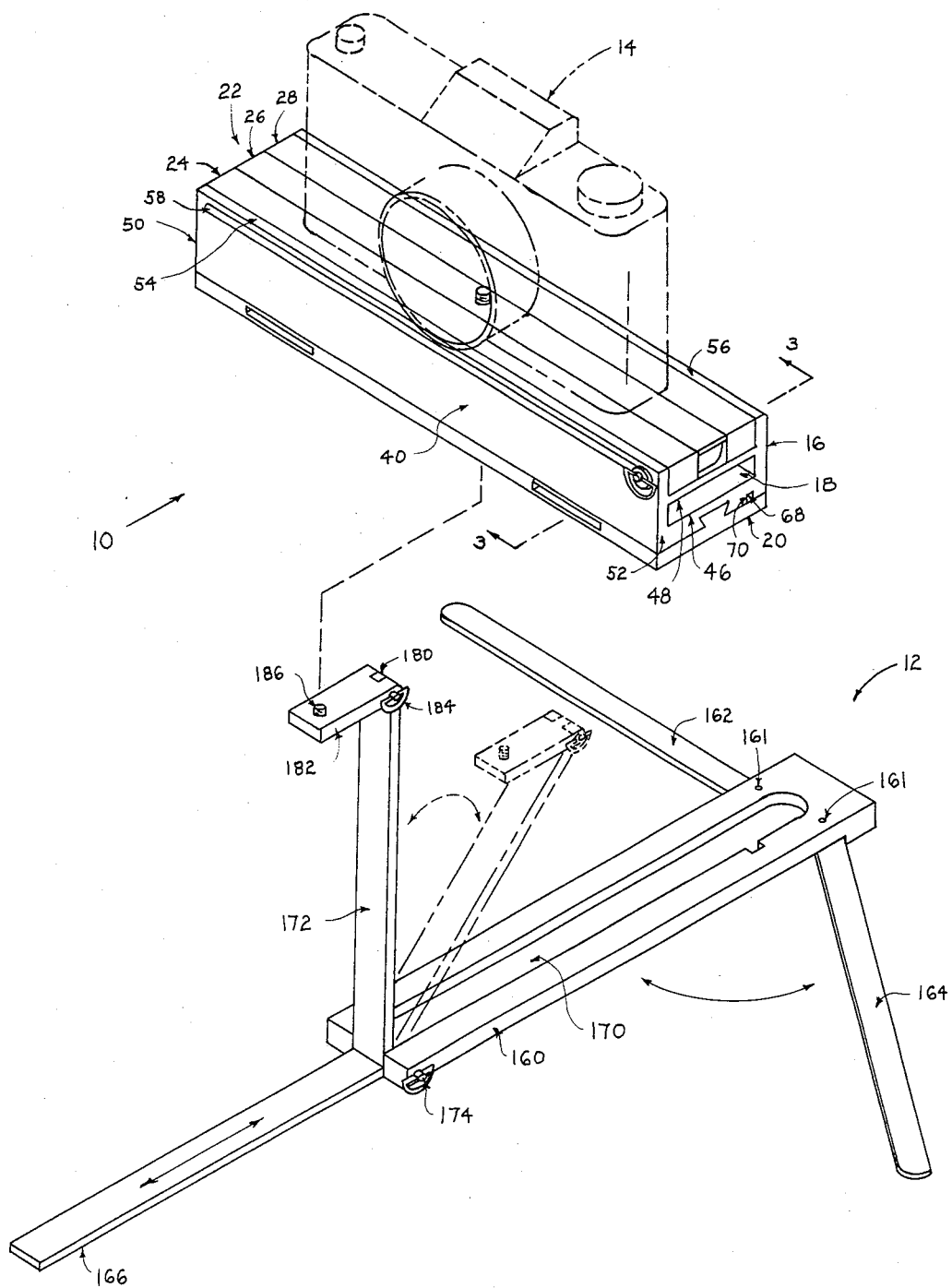
FIG. 1 is an isometric view of a tiltable camera attachment and portable attachment support of the present invention. The camera attachment support is shown with legs in an extended position. The attachment is shown with a conventional single-lens reflex camera attached thereto in phantom lines.

A tiltable tripod or other camera support attachment, and a portable attachment support, in accordance with the present invention, are generally indicated at reference numerals 10 and 12, respectively. A conventional 35 mm, single-lens refex camera 14 is shown in phantom and is connected to the attachment 10.

It is to be understood that the attachment 10 and portable attachment support 12 of the present invention are usable with cameras other than the single-lens reflex camera 14. However, the attachment 10 is primarily intended for use with cameras of the type having rectangular film formats, as will become more apparent from the description below.

As shown in FIG. 1, the attachment 10 has an elongated frame 16, defining a portable attachment support receptacle 18. A base 20 is slidably connected to the frame 16. Three elongated arms, generally indicated at reference numeral 22, including a forward arm 24, a middle arm 26, and a rearward arm 28 are pivotally interconnected, and pivotally connected to the frame 16, so as to be movable as shown in FIG. 6 and in FIGS. 5 through 11.

Movement of the arms 22 as shown permits reformatting of the camera 14 between horizontal and vertical compositions while compensating for horizontal and vertical parallax error introduced by rotation of the arms with respect to the frame. FIGS. 6 through 8 diagrammatically illustrate the reformatting of a camera view from horizontal to vertical while compensating for horizontal parallax error introduced into the view by rotation of the arms.

Figures 6, 7, 8:
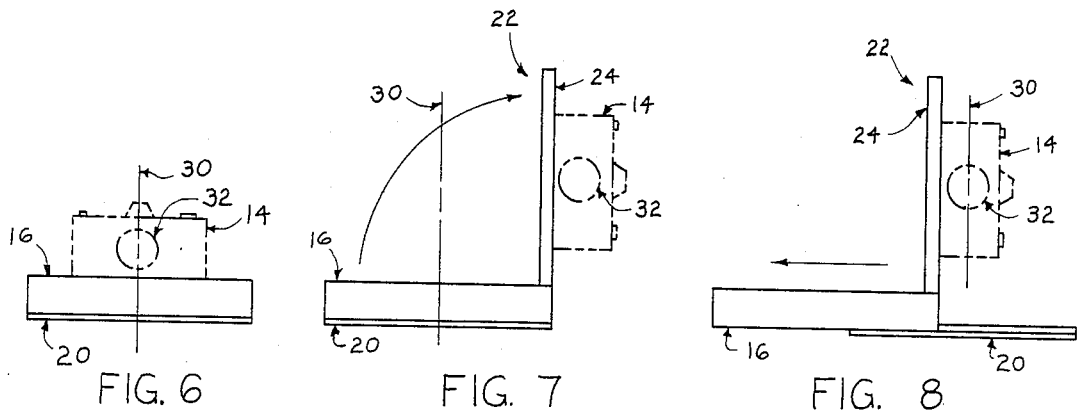
FIG. 6 is a diagrammatic representation of the attachment with a camera having a horizontally formatted view.
FIG. 7 is a diagrammatic representation similar to FIG. 6 in which the camera has been rotated ninety degrees in a clockwise direction.
FIG. 8 is a diagrammatic representation similar to FIG. 7 in which horizontal parallax error introduced by rotation of the camera has been corrected.

As shown in FIG. 6, the camera 14 is positioned to compose a horizontal photograph. The frame 16 is centered with respect to the sliable base 20, and a vertical line 30 intersects the axis of the camera lens 32. The camera 14 is attached to the middle arm 26, as will be further described below. As shown in FIG. 7, the forward arm 24 and middle arm 26, (refer to FIG. 2) are rotated ninety degrees clockwise to reformat the camera 14 from a horizontal to a vertical composition. Note that the axis of the camera lens 32 is displaced from the vertical line 30, which intersects the original position of the camera lens axis, as shown in FIG. 6.

The horizontal separation distance between the line 30 in FIG. 7 and the axis of the lens 32 is related to the horizontal parallax error, which will be apparent in the viewfinder of the camera 14. As shown in FIG. 8, the frame 16 can be translated with respect to the base 20 to horizontally align the axis of the lens 32 so as to eliminate the apparent horizontal parallax error (in FIGS. 6, 7, and 8, the base 20 is considered to be attached to a tripod 36 or other camera support, which is shown in FIG. 11).

Note that in FIG. 8, although the horizontal parallax error has been compensated for, a vertical parallax error has been introduced into the recomposed camera view. This can easily be compensated for by adjusting the vertical height of the tripod center column. Thus, the camera view can be reformatted from horizontal to vertical without introducing parallax error into the recomposed view and without repositioning the tripod or camera support which is attached to the base 20.

Figure 2:
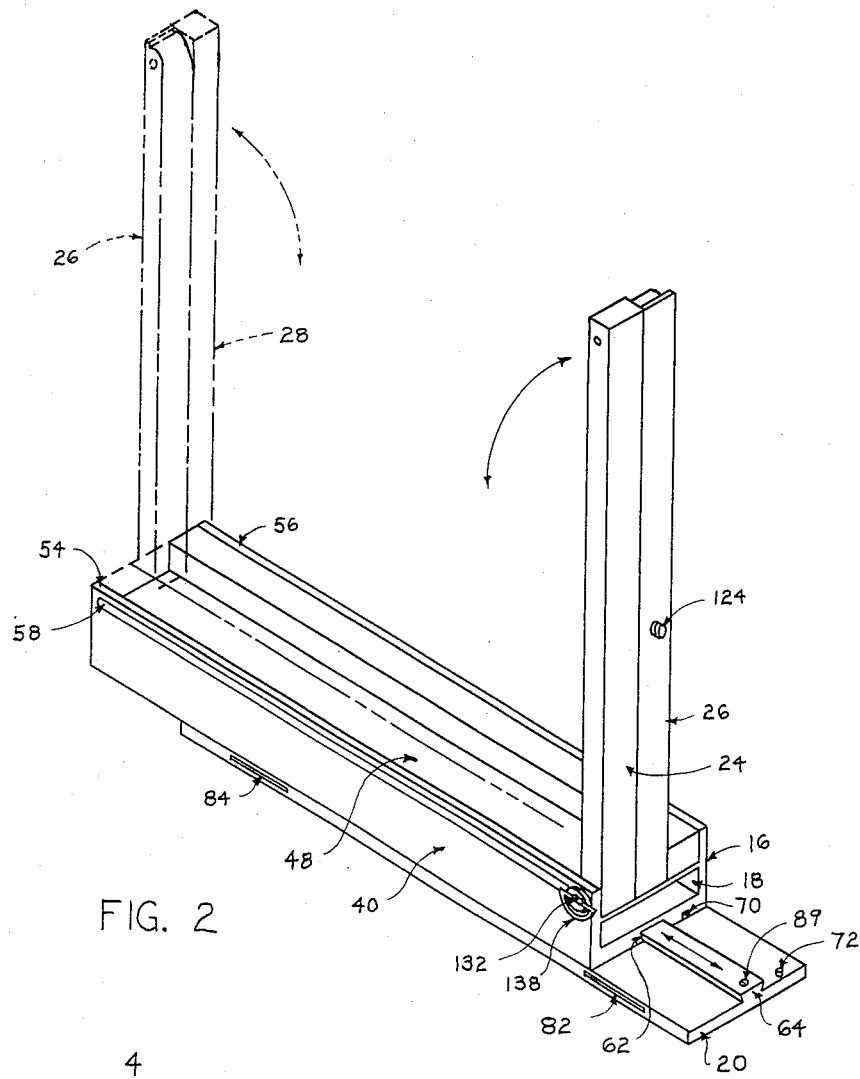
FIG. 2 is an enlarged isometric view of the camera attachment shown in FIG. 1.

In the example depicted in FIGS. 6 through 8, the camera has been rotated ninety degrees clockwise. Note that a similar sequence could be followed to rotate the camera 14 ninety degrees counterclockwise by pivoting the middle arm 26 and rearward 28, as shown in FIG. 2, and by translating the base 16 in the direction opposite to that shown in FIG. 8.

Figure 9:
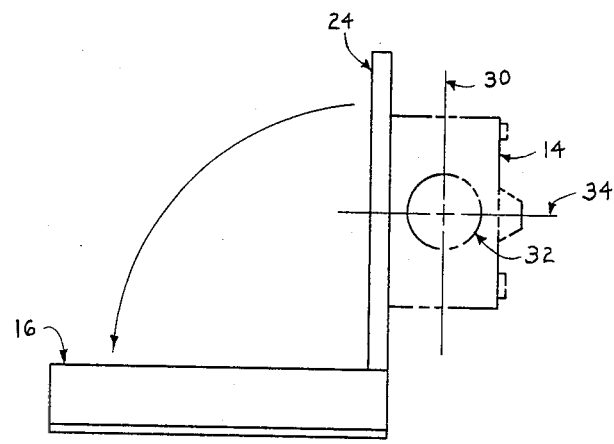
FIG. 9 is a diagrammatic representation of the atatchment with a camera formatted for a vertical view.
Figure 10:
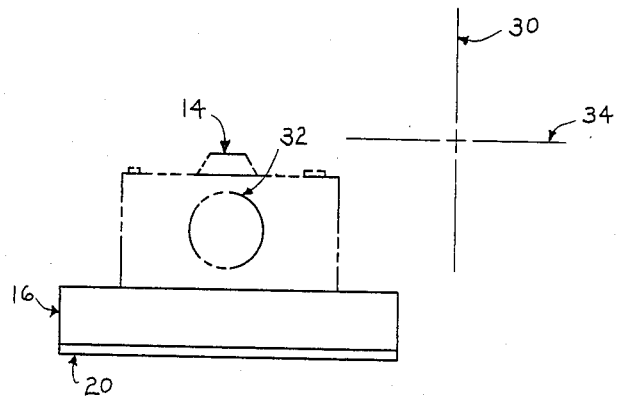
FIG. 10 is a diagrammatic representation similar to FIG. 9 showing the camera rotated ninety degrees counterclockwise to reformat the camera to a horizontal view.
Figure 11:
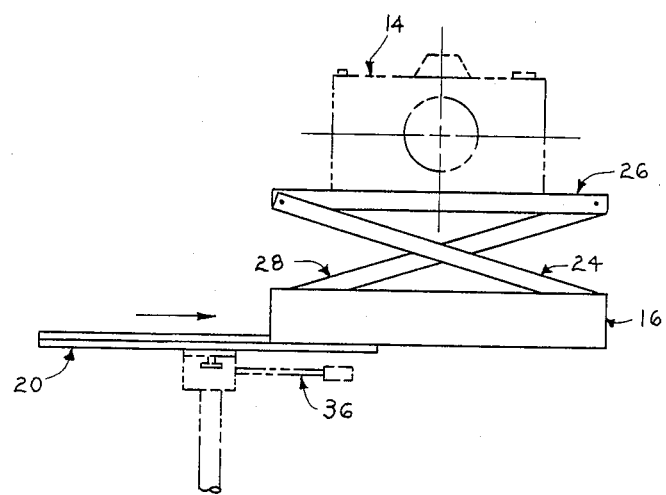
FIG. 11 is a diagrammatic representation, similar to FIG. 10, illustrating horizontal and vertical displacement of the camera utilizing the attachment to eliminate both horizontal and vertical parallax error introduced by rotation of the camera as shown in FIGS. 9 and 10.

FIG. 5 and FIGS. 9 through 11 illustrate use of the arms 22 for adjusting the vertical height of the middle arm 26. This capability permits reformatting of the camera 14 in FIG. 9 from a vertical composition to a horizontal position, as shown in FIG. 10, with compensation for both horizontal and vertical parallex error, as shown in FIG. 11.

The camera 14 is shown in a vertical position in FIG. 9, similar to that shown in FIG. 8. The intersection of vertical line 30 and horizontal line 34 designates the axis of the camera lens 32. To reformat the camera 14 to a horizontal view, the forward arm 24 and middle arm 26 are rotated ninety degrees counterclockwise, as shown by the arrow in FIG. 9, to result in the camera position shown in FIG. 10.

In FIG. 10, the axis of the lens 32 is displaced both horizontally and vertically from the original position of the lens axis shown in FIG. 9, as indicated by the intersection of lines 30 and 34 in FIG. 10. To compensate for the horizontal parallax error which will be apparent in the viewfinder of camera 14 in FIG. 10, the frame 16 is translated in the direction of the arrow shown in FIG. 11. To compensate for the vertical parallax error, the middle arm 26 is vertically displaced from the frame 16 by rotation and translation of the forward arm 24 and rearward arm 28, as will be more fully described below. Note that in this example, it is not necessary to adjust the column of the tripod (not shown) which has been attached to the base 20 to compensate for vertical parallax error. Furthermore, it is apparent that if the camera 14 in FIG. 9 were vertically reoriented 180 degrees (i.e., the middle arm 26 and rearward arm 28 in the position shown in FIG. 2), a similar series of steps could be followed to reformat the camera 14 to a horizontal position without parallax error.

As best seen in FIGS. 1 through 4, the frame 16 has a vertical forward side 40, an opposite, vertical rearward side 44, a transverse lower bed 46, and an opposite transverse upper bed 48 which define the portable attachment support receptacle 18. The frame also has a frame first end 50 and an opposite frame second end 52 which define openings for the portable attachment support receptacle 18. For the purposes of this description, the first end 50 and the second end 52 shall describe directions in the figures towards the left and towards the right, respectively, of the frame 16.

The vertical forward side 40 and opposite vertical rearward side 44 of the frame 16 each have elongated, vertically extending forward and rearward flanges 54, 56 which define elongated forward and rearward apertures 58, 60, respectively. The flanges 54, 56 and the upper bed 48 also define a receptacle for the arms 22 when the arms are nested, as shown in FIGS. 1 and 3.

Figure 3:
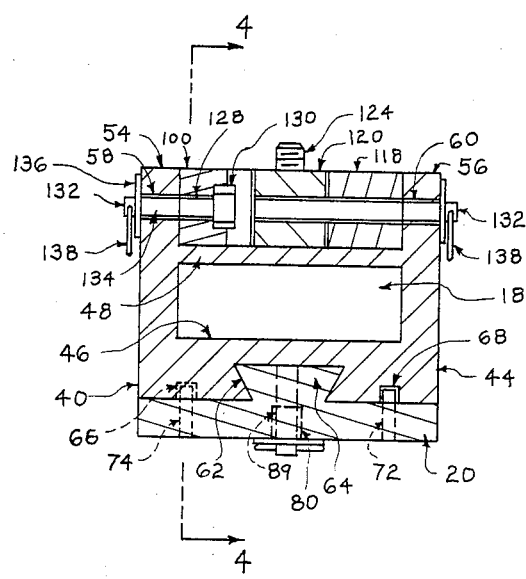
FIG. 3 is an enlarged side-elevational, cross-sectional view taken along line 3—3 of FIG. 1 of the camera attachment.
Figure 4:
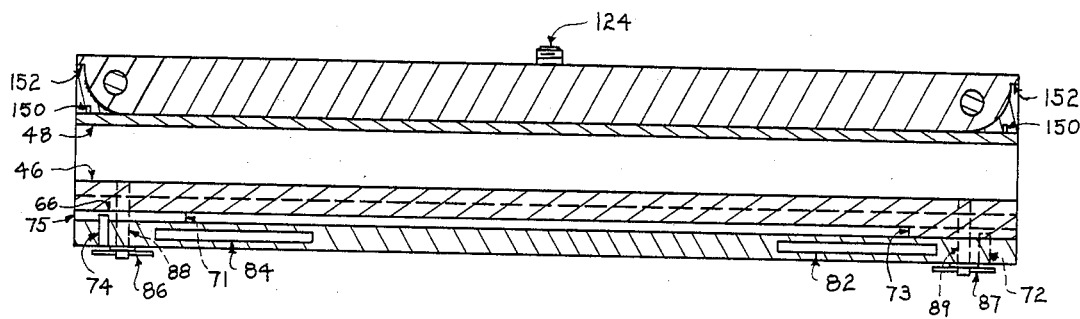
FIG. 4 is a front-elevational, cross-sectional view of the camera attachment taken along line 4—4 of FIG. 3.

As best seen in FIG. 3, the lower bed 46 of the frame 16 has an elongated mortise 62 which slidably receives a tenon 64 on the base 20 to permit relative linear motion therebetween. As best seen in FIGS. 3 and 4, the lower bed 46 also has two elongated forward and rearward slots 66, 68. Rearward slot 68 has an open end 70 on the second end of the frame and an end wall 71 adjacent to the first end of the frame. A corresponding rearward pin 72 protrudes from the base 20 to pass through the open end 70 of the slot 68 until an end wall 73 is encountered. This interaction limits the maximum displacement of the frame 16 with respect to the base 20 towards the right, as shown in the figures. Similarly, a forward pin 74 protrudes from the base 20 to engage the forward slot 66 through an open end 75 in the first end of the frame 16 until the forward pin 74 encounters an end wall in the forward slot 66 (approximately at the position of the section taken along line 3—3) at the second end of the frame to limit the maximum linear displacement of the frame 16 relative to the base 20 towards the left.

The base also has a conventional tripod socket 80 centered in the base 20 to accept the threaded nut of the conventional tripod 36 or other support device. The base also defines transverse apertures 82, 84 to accept straps (i.e., of the type having Velcro ® brand fastening means) to attach the base to an external object, such as a post or tree branch. Tightening nuts 86, 87 have upwardly extending threaded sections 88, 89. The threaded sections can be vertically adjusted by turning either of the tightening nuts to frictionally engage the mortise 62 in the frame 16. In this way, the position of the base with respect to the frame can be selectively locked.

Figure 5:
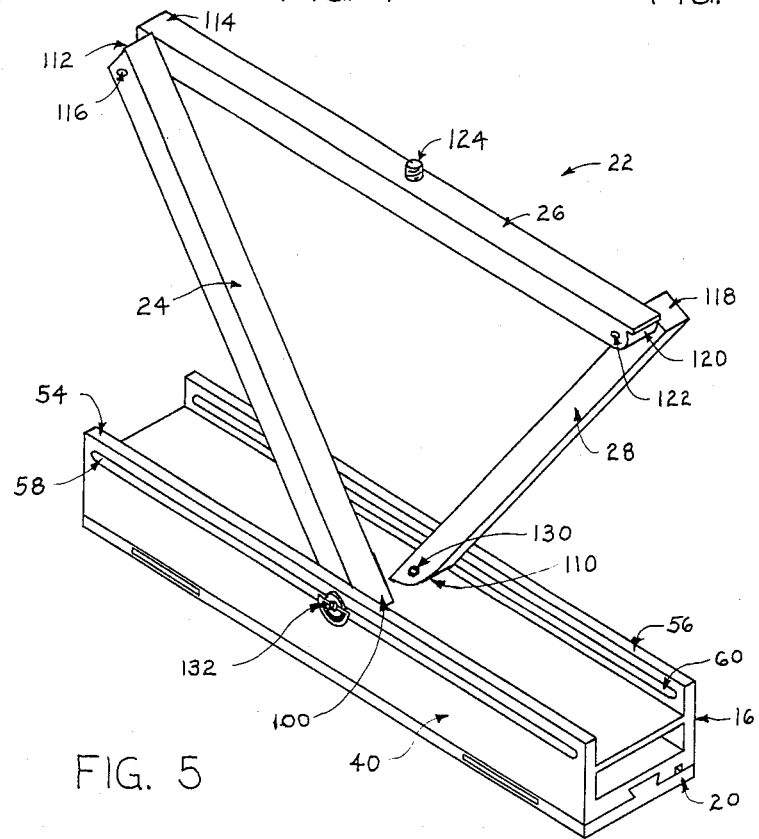
FIG. 5 is an isometric view of the camera attachment illustrating a second feature of the invention.

The pivotal interconnection of the three elongated arms 22 and frame 16 is best seen in FIGS. 2, 3, and 5. As can be seen from FIG. 5, the second end 100 of the forward arm 24 is pivotally and slidably attached to the forward flange 54 by way of the forward aperture 58. The first end 110 of the rearward arm 28 is pivotally and slidably attached to the rearward flange 56 by way of rearward aperture 60.

The first end 112 of the forward arm 24 is pivotally attached to the first end 114 of the middle arm 26 by a dowel 116. The second end 118 of the rearward arm 28 is pivotally connected to the second end of the middle arm 120 by a similar dowel 122. A threaded attachment bolt 124 is centrally located on the middle arm 26 for engagement with the tripod socket of a camera, such as camera 14.

The interconnection of the forward and rearward arms 24, 28 with the middle arm 26 and the pivotal connection between the forward and rearward arms with the frame 16 permit alternate clockwise rotation of forward arm 24 and middle arm 26 and counterclockwise rotation of middle arm 26 with rearward arm 28, as shown in FIG. 2. The slidable connection between the forward arm 24 and rearward arm 28 with the frame 16 permits vertical elevation of the middle arm 26, as shown in FIGS. 5 and 11.

FIG. 3 illustrates the detailed construction of the pivot and slide structures described above. The second end 100 of the forward arm 24 nonrotatably receives a threaded sleeve 128 having a hexagonal head 130. The head 130 is received by the second end 100 of the forward arm 24 so as to prevent relative rotation therebetween. A tightening nut 132 having a cooperatively threaded shaft 134 and an annular flange 136 passes through the elongated forward aperture 58.

The threaded shaft 134 is cooperatively received in the threaded sleeve 128. The axial separation distance between the annular flange 136 and hexagonal head 130 can be decreased by rotating a D-ring 138 attached to the tightening nut 132. This causes the second end 100 of the forward arm 24 and the annular flange 136 to frictionally engage the intermediate portion of the forward flange 54 to prevent substantial counterrotation of the forward and middle arms 24, 26 from the position shown in FIG. 2. Furthermore, any tendency of the forward and middle arms 24, 26 to counterrotate in a counterclockwise direction, as shown in FIG. 2, is resisted as the nonrotational engagement between the hexagonal head 130 and second end 100 of the forward arm 24 tends to increase the frictional engagement of the forward arm with the forward flange 54. With reference to FIG. 5, it is seen that the second end of the forward arm 24 can be linearly translated so as to reposition the tightening nut 132 with respect to the elongated forward aperture 58 so as to position the forward arm 24 as shown in FIGS. 5 and 11. The first end of the rearward arm 28 is provided with an identical structure to permit selective translation and rotation of the rearward arm 28, as has been described for the forward arm 24.

The ability of the arms 24, 26, 28 to resist counterrotation enables the photographer to securely maintain arm pairs 24, 26 and 26, 28 (shown in FIG. 2) in any position between zero and ninety degrees by selectively tightening and loosening the tightening nuts 132. This feature is especially advantageous when the base 20 is supported by a non-horizontal surface (i.e., when the base is strapped to a tree limb, etc.). The arm pairs can be rotated and locked into a position which levels the camera format. Tightening nuts 86, 87 on the base can be adjusted to hold the frame 16 with respect to the base in a position which properly centers the photographic subject in the camera viewfinder.

Overrotation of the arms 22 beyond a perpendicular position with respect to the transverse upper bed 48 is undesirable. Therefore, the upper bed 48 is provided, adjacent to the first and second ends of the frame 16, with upwardly projecting, transverse ridges 150 (see FIG. 4). The ridges abut arm projections 152 on the first and second ends of each arm when the arms are in the positions shown in FIG. 2. Other means for preventing overrotation of the arms can also be provided, as will be apparent to those of skill in the art.

The portable attachment support 12 shown in FIG. 1 is collapsible so as to be receivable in the portable attachment support receptacle 18 of the frame 16, as previously described. The support 12 has an elongated body 160 having a thickness slightly less than the separation distance between the lower bed 46 and upper bed 48 of the frame 16. The body 160 also has a width which is slightly less than the separation distance between the forward side 40 and rearward side 44, which defines the width of the receptacle 18.

The support has two legs 162, 164 which are pivotally attached to the body 160 by any conventional means, such as pivot pins 161. The body 160 is recessed so as to permit the legs 162, 164 in a folded position to be flush with the exterior lines of the body. A third leg 166 is slidably connected to the body. The third leg is extendable and retractable in the direction of the arrow in FIG. 1. The third leg has a thickness which is approximately one-half that of the body 160, so that the top of the body and the third leg define an elongated receptacle 170 when the third leg 166 is retracted. An elevation arm 172 is pivotally connected to the body 160 by a tightening nut and sleeve assembly 174 similar in construction to the tightening nut 132 and threaded sleeve 128 described above.

The elevation arm 172 is not rotatable beyond the perpendicular position shown in FIG. 1. However, the elevation arm 172 is pivotable about the axis defined by the tightening nut and sleeve assembly 174 so as to be receivable in the elongated receptacle 170. The end 180 of the elevation arm 172 is pivotally connected to a projection 182 through a tightening nut and sleeve assembly 184 similar to the tightening nut and sleeve assembly 174. The projection 182 rotatably supports a threaded attachment bolt 186 identical to the threaded attachment bolt 124 centered in middle arm 26. The threaded attachment bolt 186 is receivable in the tripod socket 80 of base 20. The portable attachment support 12 can be used to support the attachment 10 when a tripod or other conventional support is not available. The portable attachment support 12 is also conveniently receivable in the receptacle 18, as previously described.

What is claimed is:

1. An attachment for a camera tripod, support, or the like for use with cameras of the type having rectangular formats in order to allow horizontal to vertical reformatting of the camera view without introducing horizontal parallax error into the view, comprising:

an elongated frame having first and second ends and forward and rearward sides;

an elongated rearward arm having first and second ends, the first end pivotally connected to the first end of the frame rearward side;

an elongated forward arm having first and second ends, the second end pivotally connected to the second end of the frame forward side;

a middle arm having first and second ends and an intermediate section having means for securing a camera thereto, the middle arm first end pivotally connected to the first end of the forward arm, and the middle arm second end pivotally connected to the second end of the rearward arm, so that the rearward and middle arms are pivotable about a first rotational axis at the first end of the frame and so that the forward and middle arms are also pivotable about a second rotational axis at the second end of the frame; and a base, slidably connected to the frame for relative linear movement therebetween and having means for attaching a camera support thereto, whereby a camera attached to the middle arm can be rotated ninety degrees about either axis and the frame can be linearly displaced with respect to the base to eliminate horizontal parallax error introduced by rotation of the middle arm about the axes.

2. The attachment of claim 1, including rotation-limiting means for limiting maximum rotation of the arms about the rotational axes to approximately ninety degrees.

3. The attachment of claim 1, including counterrotation-preventing means for selectively preventing substantial counterrotation of the arms.

4. The attachment of claim 3, including means for selectively locking the base with respect to the frame.

5. The attachment of claim 3, including arm sliding means for permitting linear displacement of the rearward arm first end and forward arm second end with respect to the frame to allow vertical displacement of the middle arm with respect to the frame for vertical adjustment of the camera position.

6. The attachment of claim 3 wherein the counterrotation-preventing means includes a rearward flange on the frame having a portion at the first end of the frame defining a rearward aperture adjacent to the first end of the rearward arm, and a forward flange on the frame having a portion at the second end of the frame defining a forward aperture adjacent to the second end of the forward arm, wherein the pivotal connections between the forward arm and the frame and the rearward arm and the frame each include a threaded sleeve mounted against rotation on the arm and a tightening nut having a cooperatively threaded portion and a flange-engaging portion, wherein the threaded portion passes through the flange aperture and engages the threaded sleeve in the adjacent arm end so that the flange and arm end are frictionally engageable, whereby counterrotation of the arm increases the frictional engagement to prevent further counterrotation.

7. The attachment of claim 6 wherein the flanges are elongated and define elongated apertures whereby the rearward arm first end and forward arm second end are slidable with respect to the frame to allow vertical displacement of the middle arm with respect to the frame for vertical adjustment of the camera position.

8. The attachment of claim 1 wherein the frame defines a receptacle having an open end, and wherein the attachment includes a separable, foldable attachment support having a plurality of legs movable between open and closed positions, wherein the attachment support is sized so as to be receivable in the frame receptace when the legs are in the closed positions.

9. The attachment of claim 1, including slide-limiting means for limiting the relative linear movement of the base and frame.

10. An attachment for a camera tripod, support, or the like for use with cameras of the type having rectangular formats in order to allow horizontal to vertical reformatting of the camera view without introducing horizontal parallax error into the view, comprising:

three pivotally interconnected arms, one of the arms having means for securing a camera thereto;

a frame having pivotal connection means for pivotally connecting one of the arms thereto; and a base, slidably connected to the frame for relative linear movement therebetween, wherein a camera secured to one of the arms by the camera-securing means can be rotated ninety degrees about the pivotal connection means and the frame can be linearly displaced with respect to the base to eliminate horizontal parallax error introduced by rotation of the camera about the pivotal connection means.

* * * * *